UNITED STATES PATENT OFFICE.

LUDWIG H. REUTER, OF BERKELEY, CALIFORNIA.

PROCESS OF PRODUCING CERTAIN PROTEIDS FROM BUTTERMILK.

No. 911,269.  Specification of Letters Patent.  Patented Feb. 2, 1909.

Application filed January 2, 1908. Serial No. 408,885.

*To all whom it may concern:*

Be it known that I, LUDWIG H. REUTER, a citizen of the United States, residing at Berkeley, in the county of Alameda and State of California, have invented a new and useful Process of Producing Certain Proteids from Buttermilk, of which the following is a specification.

Buttermilk, the by-product in the manufacture of butter from cream, is used to some extent for feeding calves, hogs, etc. where a relatively small amount is available, but large butter-making establishments which have to figure with thousands of gallons of buttermilk as their daily by-product during the season, have met with difficulties in finding any outlet for such a large quantity of by-product.

Experiments, which have been made heretofore for the purpose of separating casein from buttermilk have proved to be a failure, because the casein, obtained by heating the buttermilk, did not dissolve in the usual casein solvents, and consequently such casein could not be used for technical purposes, as it did not, even if macerated in finest pulverized condition with alkali, yield a glue leaving smooth surfaces when used for coating papers, or as an addition to cold water paints.

Now, I have discovered, that the above described insolubility of casein obtained from buttermilk, is due to the presence in that casein of finely coagulated milk albumen, and I have discovered a process for subjecting the buttermilk to a chemical treatment, which in the end yields casein, soluble in the usual solvents, and useful for technical purposes, and which allows at the same time the recovery of milk albumen, sugar of milk, lactic acid, and lactates practically without decomposition.

Broadly speaking, my process consists in neutralizing the acid of the buttermilk by means of an alkali while in a cool condition so as to convert the casein into a soluble salt, separating the milk albumen, and thereafter precipitating the casein. After the acid is neutralized, the process is proceeded with by heating and macerating the mixture to dissolve the casein and separate the milk albumen, cooling, clarifying at a low temperature, and filtering. The filtrate is then heated moderately and the casein precipitated by an acid, preferably by sulfurous acid or an acid salt thereof. This method of precipitation after the neutralization of the acid of the buttermilk is an important part of the process. The second filtrate is used to make sugar of milk, lactic acid, and lactates, and the first press-cake for making milk albumen. Thus the buttermilk is separated into its constituent proteids, and pure casein, free from milk albumen is obtained.

In detail the process may be carried out in the following way:—Buttermilk, as obtained from the butter-maker, is put in an apparatus provided with a stirrer, a cooling coil, and a steam coil. Then while stirring, alkali, preferably sodium carbonate, is added for the purpose of neutralizing the free lactic acid. Care should be taken not to heat the liquid, but to cool it preferably to about 32° F. until all the acid has been neutralized and the casein has been converted into a soluble salt. If this part of the process is carried out at a higher temperature, the yield will not be as great, nor the casein as pure. While stirring the liquid, it is desirable to take samples from time to time, and to add more alkali if necessary. Care must be taken also not to use an excess of alkali, as the same has the tendency of decomposing the casein and of forming alkali compounds of the milk albumen. After the stirring has been continued for, say, about an hour, the cooling is discontinued, the steam turned on, and the neutral liquid, stirring all the time, macerated for about two hours at a temperature of about 150° F. I have found that in this time the casein dissolves properly and separates from the milk albumen. Finally, the liquid is heated only for about a minute to almost the boiling point for the purpose of separating more completely the milk albumen, then the steam is turned off and the liquid at once cooled. While ordinary cold water will suit the purpose for smaller operations, on a large scale I prefer to cool by means of refrigeration, as for example, by means of a coil through which ice-cold brine or calcium chlorid solution, or the like is passing. This process of cooling is also preferable where the temperature of the ordinary water supply, in the summer-time, is too high, such as I have found is the case in some of the larger cities. As soon as the liquid has been clarified by settling at a low temperature, it is filtered through cloth, on the larger scale preferably by means of a filter-press, in a clean tank provided with a steam coil. The filtrate is then heated to about 150° F., and the casein precipitated by means of an acid or an acid salt. Although I have obtained good casein on precipitating it by means of acid, like sulfuric acid, or by means of acid salts, such as niter cake, I have found that it is preferable to use a compound containing the radical (SO$_2$), preferably sulfurous acid, or an acid sulfite, such as sodium bisulfite, in connection with sulfuric acid. Care must be taken to regulate the temperature carefully and not to go much above 150° F., as at higher temperatures milk-albumen, if such should still be present in small quantities, might be coagulated and precipitated together with the casein. The precipitated casein, thus obtained, can be washed with water, run through a curd-mill, and be dried in a drying room provided with a good ventilator for the purpose of drawing off the moisture as quickly as possible. Casein, thus obtained, and properly disintegrated and ground, I have found to give a good glue, and to be especially valuable in connection with lime as an addition to cold water paints. The presence of a small quantity of sulfurous acid in the casein is an advantage, as it tends to preserve the casein, as well as glues prepared with the same.

The milk albumen obtained in my process by means of the filter-press is practically pure, and can be used for feeding purposes. The press-cakes should immediately be broken up and dried in a drying closet provided with a good ventilator.

The filtrate obtained by precipitating the casein by means of sufurous acid, I use for manufacturing sugar of milk in the usual way, and I have discovered that practically no sugar of milk is lost by decomposition, even if an excess of sulfurous acid has been used to precipitate the casein, while it is an established fact that much sugar of milk is decomposed if, for instance, sulfuric acid is used for precipitating purposes. The mother liquor obtained in the sugar of milk manufacture I have used with advantage as a source for making pure medicinal lactic acid and lactates.

While I have described in detail a preferred way of carrying out the process, stating the temperatures which I have found to be most suitable, I am aware that many modifications may be made in carrying out the process without departing from the scope of the invention as expressed in the claims. Therefore I do not wish to be limited in all respects to the details of the process as set forth above, but What I do claim is:—

1. A process of treating buttermilk which consists in neutralizing the acid thereof at a low temperature, near 32° F., then heating above 100° F., and thereafter cooling and filtering and subsequently precipitating the casein.

2. A process of treating buttermilk which consists in neutralizing the acid thereof at a low temperature, then moderately heating for a considerable period of time, then heating for a short time almost to the boiling point, thereafter cooling and filtering and subsequently precipitating the casein.

3. The process of treating buttermilk, which consists in neutralizing the acid thereof at a low temperature, heating to about 150° Fahrenheit for a period of more than an hour, then heating for about a minute to a temperature almost at the boiling point, then cooling, clarifying, and filtering and subsequently precipitating the casein.

4. A process of treating buttermilk which consists in adding an alkali thereto, stirring and cooling to neutralize the acid of the buttermilk, and converting the casein into soluble salt, heating moderately, macerating, and stirring under a moderate temperature to dissolve the casein and separate the milk albumen, then heating almost to the boiling point to more completely separate the milk albumen, at once cooling, clarifying and filtering and subsequently precipitating the casein.

5. A process for treating buttermilk to separate it into its constituents which consists in adding an alkali thereto to neutralize the acid of the buttermilk, and converting the casein into a soluble salt, heating moderately, macerating, and stirring under a moderate temperature to dissolve the casein and separate the milk albumen, then heating almost to the boiling point to more completely separate the milk albumen, and at once cooling, clarifying and filtering, heating the filtrate to a moderate temperature, and precipitating the casein by sulfurous acid.

6. A process for treating buttermilk to separate it into its constituents which consists in adding an alkali thereto to neutralize the acid of the buttermilk, and converting the casein into a soluble salt, heating moderately, macerating, and stirring under a moderate temperature to dissolve the casein and separate the milk albumen, then heating almost to the boiling point to more completely separate the milk albumen, and at once cooling, clarifying and filtering, heating the filtrate to a moderate temperature, precipitating the casein by sulfurous acid, and breaking up and drying the first press-cake to produce milk albumen.

7. A process of treating buttermilk which consists in neutralizing the acid thereof, heating, separating the milk albumen, and thereafter filtering, heating the filtrate to a moderate temperature, and finally precipitating the casein therefrom.

8. A process of treating buttermilk which consists in neutralizing the acid thereof, heating, separating the milk albumen filtering, heating the filtrate to a moderate temperature, and finally precipitating the casein by means of a compound containing the radical ($SO_2$).

9. A process of treating buttermilk which consists in neutralizing the acid thereof, heating, separating the milk albumen, filtering, heating the filtrate to a moderate temperature, precipitating the casein, and breaking up and drying the first press-cake.

10. A process of treating buttermilk which consists in neutralizing the acid thereof, at about freezing point, then heating above blood heat, thereafter cooling and filtering, breaking up and drying the press-cake, and precipitating casein from the filtrate.

11. A process of treating buttermilk which comprises first neutralizing the acid thereof, thereafter heating to dissolve the casein and separate the milk albumen, filtering, and finally precipitating the casein from the filtrate.

12. A process of treating buttermilk which comprises first neutralizing the acid thereof, thereafter heating to dissolve the casein and separate the milk albumen, filtering, and finally precipitating the casein from the filtrate by sulfurous acid or an acid salt thereof.

13. As an article of manufacture, casein obtained from buttermilk by precipitation and initially free from coagulated milk albumen and soluble in the usual casein solvents when produced.

14. A composition comprising casein obtained from buttermilk by precipitation by sulfurous acid, and a small amount of sulfurous acid, said casein being soluble in the usual casein solvents.

In testimony whereof I have hereunto set my hand, in the presence of two subscribing witnesses.

LUDWIG H. REUTER.

Witnesses:
W. A. HACKLEY,
ROY J. YOUNG.